United States Patent
Walker

(10) Patent No.: US 9,914,413 B2
(45) Date of Patent: Mar. 13, 2018

(54) BUS SYSTEM FOR CONFIGURING COMMUNICATION INTERFACES IN THE VEHICLE AND METHOD FOR MANUFACTURING SUCH A BUS SYSTEM

(71) Applicant: ROBERT BOSCH GMBH, Stuttgart (DE)

(72) Inventor: Steffen Walker, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 147 days.

(21) Appl. No.: 14/896,171

(22) PCT Filed: Apr. 3, 2014

(86) PCT No.: PCT/EP2014/056640
§ 371 (c)(1),
(2) Date: Dec. 4, 2015

(87) PCT Pub. No.: WO2014/195043
PCT Pub. Date: Dec. 11, 2014

(65) Prior Publication Data
US 2016/0121818 A1    May 5, 2016

(30) Foreign Application Priority Data
Jun. 5, 2013   (DE) .................. 10 2013 210 420

(51) Int. Cl.
*B60L 1/00* (2006.01)
*B60R 16/023* (2006.01)
(Continued)

(52) U.S. Cl.
CPC ............ *B60R 16/023* (2013.01); *B60R 16/03* (2013.01); *H02G 1/14* (2013.01); *H02H 9/043* (2013.01);
(Continued)

(58) Field of Classification Search
CPC ....... B60R 16/023; B60R 16/03; H04L 12/40; H04L 12/40032
(Continued)

(56) References Cited

U.S. PATENT DOCUMENTS 4,878,145 A  * 10/1989  Lace ................ H02H 9/06
361/118
5,841,620 A    11/1998  Masghati
(Continued)

FOREIGN PATENT DOCUMENTS

| DE | 195 09 133 | 10/1995 |
|---|---|---|
| EP | 0 034 288 | 8/1981 |
| WO | WO 2004/042950 | 5/2004 |

OTHER PUBLICATIONS

International Search Report for PCT/EP2014/056640, dated Sep. 23, 2014.
(Continued)

*Primary Examiner* — Thomas Skibinski
(74) *Attorney, Agent, or Firm* — Norton Rose Fulbright US LLP; Gerard Messina

(57) ABSTRACT

A bus system for configuring communication interfaces in a vehicle has at least two different bus lines which are each electrically coupled to one and the same first voltage-limiting element to limit the voltage level of a voltage pulse occurring with a predefined reference potential as a positive voltage pulse between one of the two bus lines and a first point. In addition, the two bus lines are each electrically coupled to one and the same second voltage-limiting element to limit the voltage level of a voltage pulse occurring with a predefined reference potential as a negative voltage pulse between one of the two bus lines and a second point, to a second voltage limit.

7 Claims, 2 Drawing Sheets

(51) Int. Cl.
| | |
|---|---|
| *H02H 9/04* | (2006.01) |
| *H04L 12/40* | (2006.01) |
| *H04L 25/08* | (2006.01) |
| *B60R 16/03* | (2006.01) |
| *H02G 1/14* | (2006.01) |

(52) U.S. Cl.
CPC ........ *H04L 12/40* (2013.01); *H04L 12/40032* (2013.01); *H04L 25/08* (2013.01); *H04B 2215/00* (2013.01); *H04L 2012/40215* (2013.01)

(58) Field of Classification Search
USPC .................. 307/9.1, 10.1, 10.7; 361/117–119

See application file for complete search history.

(56) References Cited

U.S. PATENT DOCUMENTS

| | | | | |
|---|---|---|---|---|
| 6,122,156 | A * | 9/2000 | Nabell | H01R 9/2441 361/119 |
| 6,195,245 | B1 * | 2/2001 | Kobsa | H04M 3/18 361/119 |
| 6,246,122 | B1 * | 6/2001 | Lin | H01L 23/50 257/355 |
| 6,377,434 | B1 * | 4/2002 | Martineau | H01C 1/16 361/106 |
| 6,795,289 | B2 * | 9/2004 | Masghati | H04M 3/18 361/111 |

OTHER PUBLICATIONS

Levin et al., "Isolated Silicon Platforms for high Current Power Management Integrated Circuit Applications", IEEE International Conference, Israel, Nov. 2011, 4 pages.

* cited by examiner

BUS SYSTEM FOR CONFIGURING COMMUNICATION INTERFACES IN THE VEHICLE AND METHOD FOR MANUFACTURING SUCH A BUS SYSTEM

BACKGROUND OF THE INVENTION

1. Field of the Invention

The present invention relates to a bus system for configuring communication interfaces in a vehicle having at least two different bus lines, the two bus lines each being electrically coupled to one and the same first voltage-limiting means to limit the voltage level of a voltage pulse occurring with a predefined reference potential as a positive voltage pulse between one of the two bus lines and a first point. The present invention also relates to a method for manufacturing such a bus system. In addition, the present invention relates to a vehicle having such a bus system.

2. Description of the Related Art

When communication interfaces are configured in vehicles, bus systems, respectively fieldbus systems, such as CAN or LIN bus systems are used, for example. In terms of electrostatic discharge (ESD) and electromagnetic compatibility (EMC), stringent demands are placed on such bus systems and the connections thereof. Moreover, the lines present in such a bus system must also allow the occurrence of voltages that reside far below the vehicle ground and can typically be down to −27 V.

From the related art, it is known to use CAN bus systems that have the electrostatic discharge protection structure shown in FIG. 1 for configuring communication interfaces in the vehicle.

Two-conductor CAN bus system 10 shown in FIG. 1 includes a first bus line, respectively CAN_H line 20 and a second bus line, respectively CAN_L line 30. Via a coupling diode 40, which is directly connected at the anode thereof to corresponding bus line 20, 30, the two bus lines 20, 30 are each routed to one and the same electrostatic discharge protection 50 for positive voltage pulses. Coupling diodes 40 are each configured as coupling diodes having a non-isolated drain.

Electrostatic discharge protection 50 for positive voltage pulses includes a first voltage-limiting means for limiting the voltage level of a voltage pulse occurring as a positive voltage pulse between one of the two bus lines 20, 30 and a ground 60. The first voltage-limiting means includes a suppressor diode (positive clamp) 70, which is directly connected at the cathode thereof to the cathodes of the two coupling diodes 40 and, at the anode thereof, directly to ground 60. Suppressor diode 70 becomes conductive when a voltage pulse occurring as a positive voltage pulse between one of the two bus lines 20, 30 and ground 60 has a voltage level that exceeds that of the breakdown voltage of suppressor diode 70. The current generated by such a positive voltage pulse is then safely conducted by suppressor diode 70 to ground 60. This prevents any build up of voltage that occurs as positive destructive voltage.

Bus lines 20, 30 are each routed to another electrostatic discharge protection 51, 52 for negative voltage pulses. A dual configuration of electrostatic discharge protection 51, 52 for negative voltage pulses is realized, i.e., an electrostatic discharge protection 51, 52 is additionally provided for each of bus lines 20, 30.

Each electrostatic discharge protection 51, 52 for negative voltage pulses includes a second voltage-limiting means for limiting the voltage level of a voltage pulse occurring as a negative voltage pulse between one of corresponding bus lines 20, 30 and a corresponding ground 61, 62. In this case, the second voltage-limiting means each includes a suppressor diode (negative clamp) 71, 72, which is directly connected at the anodes thereof to corresponding bus line 20, 30.

Each of the two suppressor diodes 71, 72 is directly connected at the cathode thereof to a corresponding reverse polarity diode 41, 42. Each of reverse polarity diodes 41, 42 is then directly connected at the anode thereof to a corresponding ground 61, 62. Each of the two suppressor diodes 71, 72 becomes conductive when a voltage pulse occurring as a negative voltage pulse between corresponding bus line 20, 30 and corresponding ground 61, 62 has a voltage level that exceeds that of the breakdown voltage of corresponding suppressor diode 71, 72. The current generated by such a negative voltage pulse is then safely conducted by corresponding suppressor diode 71, 72 to corresponding ground 61, 62. This prevents any build up of voltage that occurs as negative destructive voltage.

Electrostatic discharge protection 51, 52 for negative voltage pulses cannot be provided in the way that electrostatic discharge protection 50 can for positive voltage pulses. The reason is that the cathodes of such coupling diodes 40, which are configured with a non-isolated drain, cannot be directly hanged on bus lines 20, 30 because they do not allow the occurrence of negative voltage pulses that reside far below the vehicle ground and can be down to −27 V. For this reason, a dual configuration of electrostatic discharge protection 51, 52 for negative voltage pulses is required by way of electrically coupled reverse polarity diodes 41, 42, as described earlier.

Disadvantageous in this context is that considerable surface area is consumed since the ESD protective structure for negative voltage pulses is provided twice. A relatively large ESD protective structure must be used since currents of up to 32 A can flow in the case of the 8 kV plasma gun model. Moreover, the double design of the electrostatic discharge protection structure for negative voltage pulses leads to rectification effects when EMC, respectively DPI (direct power injection) measurements are performed. A frequently occurring consequence is that components designed in this manner do not pass the certification needed for original equipment manufacturer (OEM) requirements.

BRIEF SUMMARY OF THE INVENTION

The present invention provides a bus system, in particular a fieldbus system for configuring communication interfaces in a vehicle having at least two different bus lines. The two bus lines are each electrically coupled to one and the same first voltage-limiting means to limit the voltage level of a voltage pulse occurring with a predefined reference potential as a positive voltage pulse between one of the two bus lines and a first point. The two bus lines are each electrically coupled to one and the same second voltage-limiting means to limit the voltage level of a voltage pulse occurring with the predefined reference potential as a negative voltage pulse between one of the two bus lines and a second point.

The present invention also provides a method for manufacturing a bus system for configuring communication interfaces in a vehicle.

In the method according to the present invention, at least two different bus lines are provided that are each electrically coupled to one and the same first voltage-limiting means to limit the voltage level of a voltage pulse that occurs with a predefined reference potential as a positive voltage pulse between one of the two bus lines and a first point. In addition, the two bus lines are each electrically coupled to one and the same second voltage-limiting means to limit the voltage level of a voltage pulse that occurs with the predefined reference potential as a negative voltage pulse between one of the two bus lines and a second point.

Thus, the two bus lines of the bus system according to the present invention are routed to one and the same electrostatic discharge protection for positive voltage pulses and to one and the same electrostatic discharge protection for negative voltage pulses. The electrostatic discharge protection for positive voltage pulses includes the first voltage-limiting means, and the electrostatic discharge protection for negative voltage pulses includes the second voltage-limiting means.

It is a special advantage of the present invention that the electrostatic discharge protection structure for a bus system that may be installed in a vehicle is greatly simplified. The electrostatic discharge protection structure for negative voltage pulses features a simple design. The need is eliminated for the dual configuration of the electrostatic discharge protection structure for negative voltage pulses, as known from the related art. Thus, the electrostatic discharge protection structure according to the present invention has a symmetrical design. A great deal of silicon surface may be economized by using such a simplified electrostatic discharge protection structure. More important, however, is the improved ruggedness of a symmetrically configured ESD protective structure when performing EMC, respectively DPI measurements. Also, no rectification effects occur when working with such a symmetrically configured, electrostatic discharge protection structure when EMC, respectively DPI measurements are performed.

In one preferred specific embodiment of the present invention, the two bus lines are each electrically coupled to the first voltage-limiting means via a coupling diode, which is directly connected at the anode thereof to the corresponding bus line. Such a coupling diode is preferably a diode with an isolated drain. Such a coupling diode may also have a non-isolated drain. In addition, the two bus lines are each electrically coupled to the second voltage-limiting means via a coupling diode having an isolated drain that is directly connected at the cathode thereof to the corresponding bus line.

In the case of the bus system according to the present invention, the second voltage limit is preferably 27 V.

This means that the lines present in such a bus system according to the present invention and having a symmetrical electrostatic discharge protection structure also allow the occurrence of voltages that reside far below the vehicle ground and may typically be down to −27 V.

As mentioned earlier, in the design of the electrostatic discharge protection structure according to the present invention for positive voltage pulses, both bus lines may each be routed via a coupling diode having a non-isolated drain or each via a coupling diode having an isolated drain to one and the same electrostatic discharge protection for positive voltage pulses.

As mentioned earlier, in the design of the electrostatic discharge protection structure according to the present invention for negative voltage pulses, coupling diodes having an isolated drain are used. Such coupling diodes having an isolated drain are found in the new BCD9s semiconductor process generation. It is advantageous that the cathodes of such coupling diodes having an isolated drain may be directly hanged on the bus lines. Such coupling diodes having an isolated drain also allow the occurrence of negative voltages that reside far below the vehicle ground. Thus, both bus lines may each be routed via such a coupling diode having an isolated drain to one and the same electrostatic discharge protection for negative voltage pulses. Thus, the electrostatic discharge protection structure according to the present invention for negative voltage pulses eliminates the need for the dual configuration found in the electrostatic discharge protection structure for negative voltage pulses, as known from the related art.

In one preferred specific embodiment of the present invention, the first voltage-limiting means includes a suppressor diode that is directly connected at the anode thereof to the first point having the predefined potential. The second voltage-limiting means preferably includes another suppressor diode that is directly connected at the cathode thereof to the second point having the predefined potential.

In one preferred specific embodiment of the present invention, the cathode of the suppressor diode of the first voltage-limiting means is directly connected to the cathodes of the corresponding coupling diodes. The anode of the suppressor diode of the second voltage-limiting means is preferably directly connected in each case to the anodes of the corresponding coupling diodes having an isolated drain.

The first and second point having a predefined reference potential are preferably each connected to ground.

In the case of the bus system according to the present invention, the voltage-limiting means may be very readily realized in each case using an electrically suitably coupled suppressor diode. The two suppressor diodes used each become conductive when a voltage pulse occurring as a positive, respectively negative voltage pulse between one of the two bus lines and the corresponding ground has a voltage level that exceeds that of the breakdown voltage of the corresponding suppressor diode. The current generated by such a positive, respectively negative voltage pulse is then safely conducted by the corresponding suppressor diode to the corresponding ground. This prevents any build up of destructive voltage.

One preferred specific embodiment of the present invention provides that the bus system used be a CAN bus system or, more precisely, a two-conductor CAN bus system. In this context, one of the two bus lines is a CAN_H line, and the other of the two is a CAN_L line.

The present invention may be applied quite advantageously for a CAN FD bus, i.e., a CAN bus system having a flexible data rate. However, the present invention may just as well be applied for a CAN HS bus, i.e., a high-speed CAN bus system having a high data transmission rate of 1 Mbit/s at a maximum, for example, or a low-speed CAN bus system having a lower data transmission rate of 125 Kbit/s, for example.

In accordance with still another specific embodiment, the bus system used is a FlexRay bus system or another suitable, two-conductor bus system.

Another aspect of the present invention relates to a vehicle having a bus system according to the present invention.

In the case of the vehicle according to the present invention, the first point having the predefined reference potential and the second point having the predefined reference potential are each preferably connected to the vehicle ground.

DETAILED DESCRIPTION OF THE INVENTION

Figure 1:
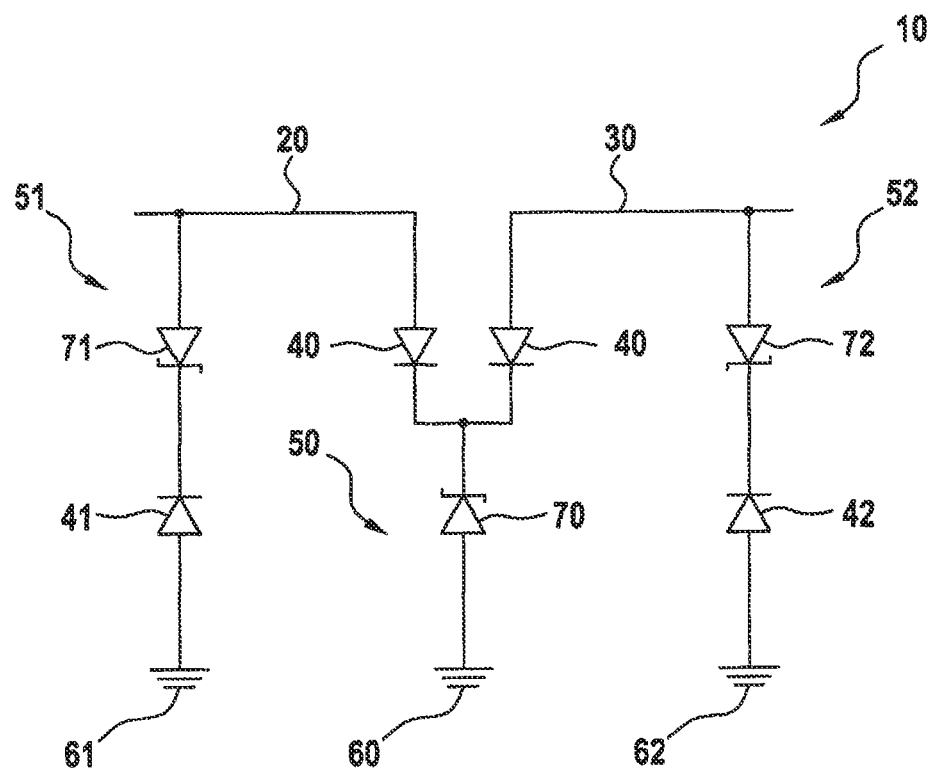
FIG. 1 shows a bus system known from the related art for configuring communication interfaces in the vehicle.
Figure 2:
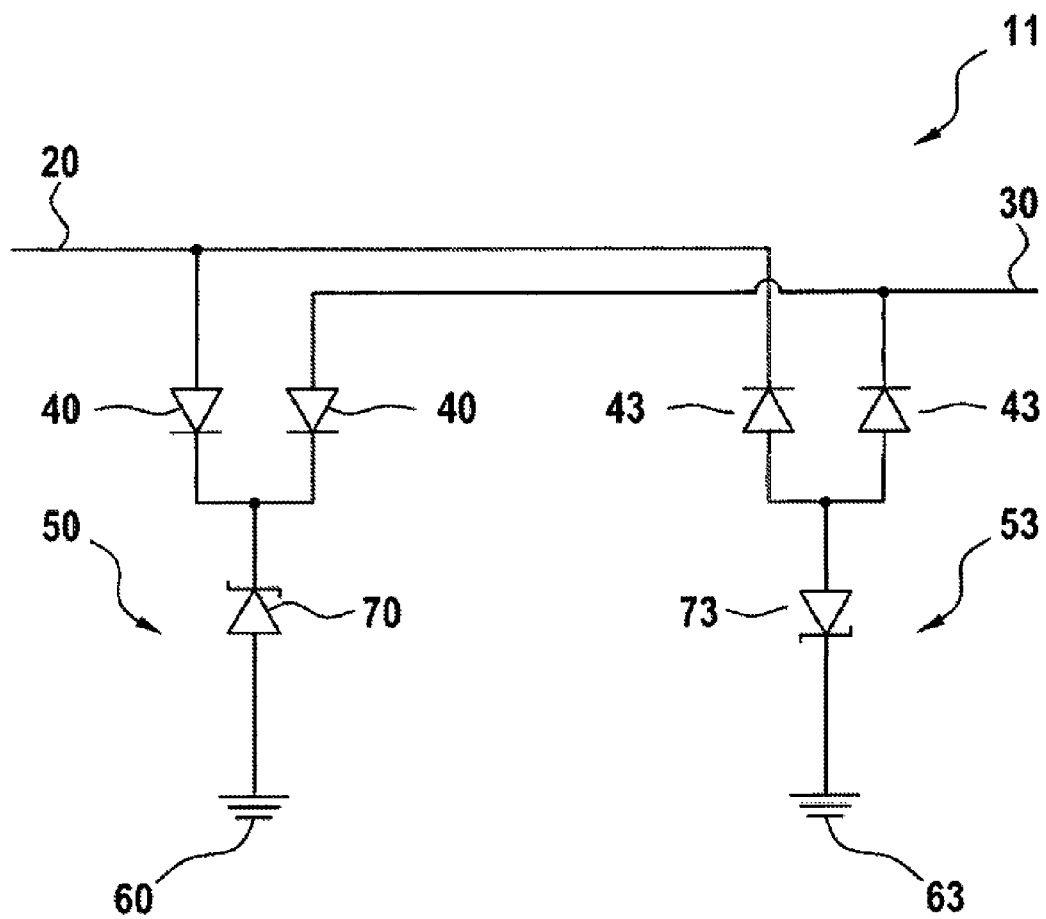
FIG. 2 shows a bus system designed in accordance with a first specific embodiment of the present invention for configuring communication interfaces in the vehicle.

FIG. 2 shows a bus system 11 designed in accordance with a first specific embodiment of the present invention for configuring communication interfaces in the vehicle. CAN bus system 11 shown in FIG. 2 includes a first bus line, respectively CAN_H line 20 and a second bus line, respectively CAN_L line 30.

In accordance with this specific embodiment, CAN bus system 11 is defined as a CAN FD bus system having a flexible data rate. However, the present invention is not limited to such a specific embodiment, but is also applicable to other suitable bus systems.

Via a coupling diode 40, which is directly connected at the anode thereof to corresponding bus line 20, 30, the two bus lines 20, 30 are each routed to one and the same electrostatic discharge protection 50 for positive voltage pulses. Coupling diodes 40 are each configured as coupling diodes having a non-isolated drain. Coupling diodes 40 may also each be configured as coupling diodes having an isolated drain.

Electrostatic discharge protection 50 for positive voltage pulses includes a first voltage-limiting means for limiting the voltage level of a voltage pulse occurring as a positive voltage pulse between one of the two bus lines 20, 30 and a ground 60. The first voltage-limiting means includes a suppressor diode (positive clamp) 70 which is connected by the cathode thereof directly to the cathodes of the two coupling diodes 40 and, at the anode thereof, directly to ground 60. Suppressor diode 70 becomes conductive when a voltage pulse occurring as a positive voltage pulse between one of the two bus lines 20, 30 and ground 60 has a voltage level that exceeds that of the breakdown voltage of suppressor diode 70. The current generated by such a positive voltage pulse is then safely conducted by suppressor diode 70 to ground 60. This prevents any build up of voltage that occurs as positive destructive voltage.

Via a coupling diode 43, which is directly connected at the cathode thereof to corresponding bus line 20, 30, the two bus lines 20, 30 are each routed to one and the same electrostatic discharge protection 53 for negative voltage pulses. Coupling diodes 43 are each configured as coupling diodes having an isolated drain. The reason is that the cathodes of such coupling diodes 43, which are configured as coupling diodes having an isolated drain, can be directly hanged on bus lines 20, 30 because they allow the occurrence of negative voltages that reside far below the vehicle ground and can be down to −27 V.

Electrostatic discharge protection 53 for negative voltage pulses includes a second voltage-limiting means for limiting the voltage level of a voltage pulse occurring as a negative voltage pulse between one of the two bus lines 20, 30 and a ground 63. The second voltage-limiting means includes a suppressor diode (negative clamp) 73 which is connected by the anode thereof directly to the anode of the two coupling diodes 43 and, at the cathode thereof, directly to ground 63. Suppressor diode 73 becomes conductive when a voltage pulse occurring as a negative voltage pulse between one of the two bus lines 20, 30 and ground 63 has a voltage level that exceeds that of the breakdown voltage of suppressor diode 73. The current generated by such a negative voltage pulse is then safely conducted by suppressor diode 73 to ground 63. This prevents any build up of voltage that occurs as negative destructive voltage.

In accordance with the first specific embodiment of the present invention, bus lines 20, 30 of bus system 11 are each routed via suitable coupling diodes 40, 43 to one and the same electrostatic discharge protection 50 for positive voltage pulses and to one and the same electrostatic discharge protection 53 for negative voltage pulses. Thus, the ESD protective structure of bus system 11 according to the present invention is designed for configuring communication interfaces in the vehicle. The need is eliminated for the dual configuration of the ESD protection structure for negative voltage pulses.

What is claimed is:

1. A bus system in a vehicle, comprising:
   at least two different bus lines which are:
   (i) each electrically coupled to a same first voltage-limiting element, wherein the first voltage-limiting element is structured and arranged so that voltage pulses occurring with a predefined reference potential as a positive voltage pulse between one of the two bus lines and a first point are limited to a first voltage threshold; and
   (ii) each electrically coupled to a same second voltage-limiting element, wherein:
   the second voltage-limiting element is structured and arranged so that voltage pulses occurring with a predefined reference potential as a negative voltage pulse between one of the two bus lines and a second point are limited to a second voltage threshold that allows voltage pulses at least down to −27 volts;
   the at least two different bus lines are each electrically coupled to the same second voltage-limiting element via a respective first coupling diode having an isolated drain; and
   a cathode of each of the respective first coupling diodes is directly connected to the respective bus line.

2. The bus system as recited in claim 1, wherein the two bus lines are each electrically coupled via a respective second coupling diode to the first voltage-limiting element, wherein an anode of the respective second coupling diode is each directly connected to the corresponding bus line.

3. The bus system as recited in claim 2, wherein at least one of (i) the first voltage-limiting element includes a first suppressor diode having an anode directly connected to the first point having the predefined potential, and (ii) the second voltage-limiting element includes a second suppressor diode having a cathode directly connected to the second point having the predefined potential.

4. The bus system as recited in claim 3, wherein at least one of (i) the cathode of the first suppressor diode of the first voltage-limiting element is directly connected to the cathode of the second coupling diode, and (ii) the anode of the second suppressor diode of the second voltage-limiting element is directly connected to the anode of the first coupling diode.

5. The bus system as recited in claim 4, wherein the bus system is one of a CAN bus system or a FlexRay bus system.

6. The bus system as recited in claim 2, wherein the first point having the predefined reference potential and the second point having the predefined reference potential are each connected to the vehicle as ground.

7. A method for manufacturing a communication bus system in a vehicle, the method comprising:

electrically coupling at least two different bus lines to a same first voltage-limiting element, wherein the first voltage-limiting element is structured and arranged so that voltage pulses occurring with a predefined reference potential as a positive voltage pulse between one of the two bus lines and a first point are limited to a first voltage threshold; and electrically coupling the at least two different bus lines to a same second voltage-limiting element, wherein:
the second voltage-limiting element is structured and arranged so that voltage pulses occurring with a predefined reference potential as a negative voltage pulse between one of the two bus lines and a second point are limited to a second voltage threshold that allows voltage pulses at least down to −27 volts;
the at least two different bus lines are each electrically coupled to the same second voltage-limiting element via a respective first coupling diode having an isolated drain; and
a cathode of each of the respective first coupling diodes is directly connected to the respective bus line.

\* \* \* \* \*